US009558561B2

(12) United States Patent
Rosselet et al.

(10) Patent No.: US 9,558,561 B2
(45) Date of Patent: Jan. 31, 2017

(54) SEMIAUTOMATIC DRAWING TOOL FOR IMAGE SEGMENTATION

(71) Applicant: VARIAN MEDICAL SYSTEMS INTERNATIONAL AG, Cham (CH)

(72) Inventors: Armel Rosselet, Baden (CH); Benjamin Haas, Brittnau (CH); David Kleiner, Mellingen (CH)

(73) Assignee: VARIAN MEDICAL SYSTEMS INTERNATIONAL AG (CH)

( * ) Notice: Subject to any disclaimer, the term of this patent is extended or adjusted under 35 U.S.C. 154(b) by 20 days.

(21) Appl. No.: 14/590,966

(22) Filed: Jan. 6, 2015

(65) Prior Publication Data

US 2016/0196661 A1    Jul. 7, 2016

(51) Int. Cl.
*G06K 9/00* (2006.01)
*G06T 7/00* (2006.01)
*G06K 9/52* (2006.01)
*G06K 9/46* (2006.01)
(Continued)

(52) U.S. Cl.
CPC ............ *G06T 7/0083* (2013.01); *G06F 3/033* (2013.01); *G06K 9/46* (2013.01); *G06K 9/4604* (2013.01); *G06K 9/4661* (2013.01); *G06K 9/52* (2013.01); *G06K 2009/4666* (2013.01); *G06T 2207/20101* (2013.01)

(58) Field of Classification Search
USPC ............... 382/100, 103, 106–107, 128–134, 382/151–154, 162–168, 173, 181, 193, 382/199, 209, 219, 232, 254, 274, 276, 382/286–291, 305, 312; 345/420; 705/2; 378/21, 4, 54
See application file for complete search history.

(56) References Cited

U.S. PATENT DOCUMENTS

2012/0053961 A1* 3/2012 Wang ................... G06Q 50/22
                                                                705/2
2012/0070052 A1* 3/2012 Maroy ................. G06T 7/0081
                                                              382/131
(Continued)

FOREIGN PATENT DOCUMENTS

EP          1405267 B1    11/2005
WO          9845809 A1    10/1998
WO       2012144957 A1    10/2012

OTHER PUBLICATIONS

Eric N. Mortensen et al., "Intelligent Scissors for Image Composition", Proceeding SIGGRAPH '95 Proceedings of the 22nd annual conference on Computer graphics and interactive techniques, 1995, pp. 191-198.

(Continued)

*Primary Examiner* — Seyed Azarian
(74) *Attorney, Agent, or Firm* — Su IP Consulting

(57) ABSTRACT

A semiautomatic drawing tool is configured to generate an image segmentation contour that corresponds to a visible edge within a digital image. Individual contour points define the shape and location of the image segmentation contour, and the semiautomatic drawing tool determines the locations of these contour points based on both user input and on the location of a steep luminance gradient that corresponds to the visible edge. The semiautomatic drawing tool determines the location of a particular point of the image segmentation contour based on the current location of an input device pointer, e.g., a cursor, the location of the steepest luminance gradient, and the location of previously selected points of the image segmentation contour.

23 Claims, 7 Drawing Sheets

(51) Int. Cl.
  *G06F 3/033*   (2013.01)
  *G01B 15/02*   (2006.01)

(56) References Cited

U.S. PATENT DOCUMENTS

| 2013/0135305 | A1* | 5/2013 | Bystrov | G06T 7/0079 |
| | | | | 345/420 |
| 2013/0188853 | A1* | 7/2013 | Makihira | G06T 11/003 |
| | | | | 382/131 |
| 2014/0219524 | A1* | 8/2014 | Takeguchi | A61B 6/463 |
| | | | | 382/128 |

OTHER PUBLICATIONS

Michael Kass et al., "Snakes: Active Contour Models", International Journal of Computer Vision, 1998, pp. 321-331.

Dirk Daneels et al., "Interactive Outlining: An Improved Approach Using Active Contours", SPIE, 1993, pp. 226-233, vol. 1908.

Eric N. Mortensen et al., "Interactive Segmentation with Intelligent Scissors", Graphical Models and Image Processing 60.5 (1998), pp. 349-384.

Patrick Perez et al., "JetStream: Probabilistic Contour Extraction with Particles", 8th IEEE International Conference on Computer Vision, ICCV 2001, Jul. 2001, pp. 524-531, vol. 2.

Alexandre X. Falcao et al., "An Ultra-Fast User-Steered Image Segmentation Paradigm: Live Wire on the Fly", IEEE Transactions on Medical Imaging, Jan. 2000, pp. 55-62, vol. 19, No. 1.

Akshaya Mishra et al., Improved Interactive Medical Image Segmentation using Enhanced Intelligent Scissors (EIS), 30th Annual International IEEE EMBS Conference, Aug. 20-24, 2008, pp. 3083-3086.

Alisha Abraham, "Interacitve Image Segmentation Based on Multiple linear Reconstruction", International Journal of Engineering Research & Technology (IJERT), May 2013, pp. 1471-1474, vol. 2, Issue 5.

* cited by examiner

SEMIAUTOMATIC DRAWING TOOL FOR IMAGE SEGMENTATION

BACKGROUND

Unless otherwise indicated herein, the approaches described in this section are not prior art to the claims in this application and are not admitted to be prior art by inclusion in this section.

Segmentation of digital images is a commonly performed operation, in which a targeted region of an image is defined and can be selected for manipulation, analysis, or other use separate from the original image. Various segmentation schemes are known in the art, and selection of the targeted region may be a largely automated process, a manual process, or a combination of both.

For example, while the process of segmenting organs or other visual structures in volumetric medical images is more and more automated, there are still applications in which the use of a manual input tool is preferred for segmenting an image. This is because a user can determine a particular biological or other structure in an image more reliably than an automated process can. However, completely manual definition of a segmented region demands careful attention by a user to prevent the introduction of segmentation artifacts and inaccuracies. For example, when a user manually traces the edge of a visual structure, such as an organ border, precisely following the edge can be problematic, particularly when a computer mouse is used as an input device; the large-scale hand and arm motions associated with using a mouse can produce traced edges that are jerky and imprecise.

In light of the above, there is a need in the art for a method of image segmentation that includes the convenience and repeatability of an automated process and the superior reliability of manual tracing techniques.

SUMMARY

In accordance with at least some embodiments of the present disclosure, a computer-implemented method of segmenting a digital image comprises calculating a direction vector based on a first point of an image segmentation contour and a second point of the image segmentation contour, wherein the image segmentation contour at least partially separates a first region of the image from a second region of the image, and constructing a luminance intensity profile for a portion of the image that intersects the direction vector at an intersection point.

In accordance with at least some embodiments of the present disclosure, a computing device configured to segment an image comprises a processor, a memory coupled to the processor, an input device coupled to the processor, and an output device, which is coupled to the processor. The input device is configured to generate a pointing device on a displayed digital image and to input image location information to the processor and the output device is configured to output image data from the processor. The processor is configured to calculate a direction vector based on a first point of an image segmentation contour and a second point of the image segmentation contour, wherein the image segmentation contour at least partially separates a first region of the displayed digital image from a second region of the displayed digital image and construct a luminance intensity profile for a portion of the displayed digital image that intersects the direction vector at an intersection point.

In accordance with at least some embodiments of the present disclosure, a non-transitory computer readable storage medium comprising computer-executable instructions, wherein in response to execution of the instructions by a computer, causes the computer to calculate a direction vector based on a first point of an image segmentation contour and a second point of the image segmentation contour, wherein the image segmentation contour at least partially separates a first region of the image from a second region of a displayed image and construct a luminance intensity profile for a portion of the displayed image that intersects the direction vector at an intersection point.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

DETAILED DESCRIPTION

Figure 1:
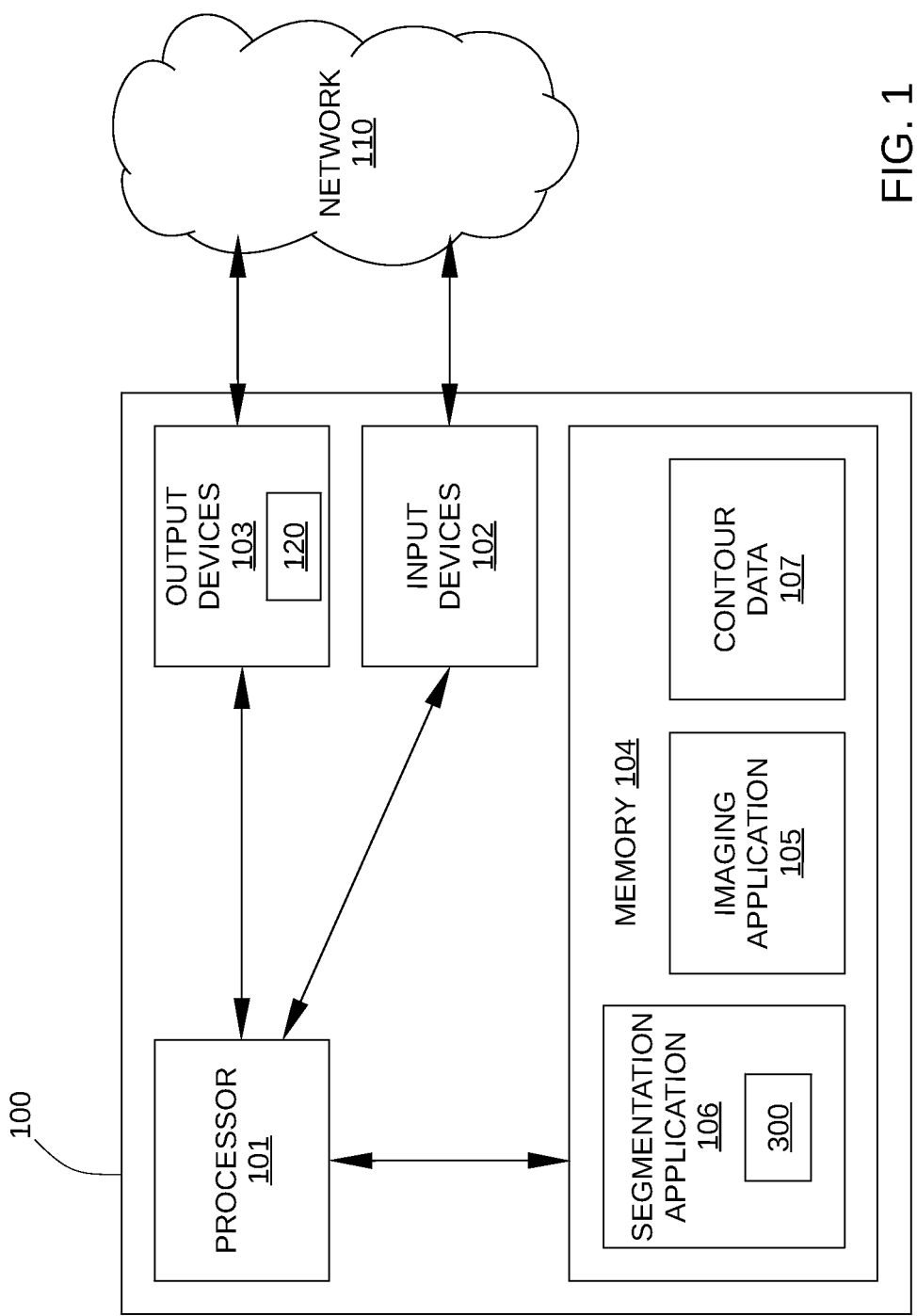
FIG. 1 is a block diagram of a computing system configured to implement one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the disclosure, as generally described herein, and illustrated in the figures, can be arranged, substituted, combined, and designed in a wide variety of different configurations, all of which are explicitly contemplated and make part of this disclosure.

According to embodiments of the present disclosure, systems and methods of segmenting a digital image employ a semiautomatic drawing tool configured to generate an image segmentation contour that corresponds to a visible edge within the image. Individual contour points define the shape and location of the image segmentation contour, and the semiautomatic drawing tool determines the locations of these contour points based on both user input and on the location of a steep luminance gradient that corresponds to the visible edge. Specifically, the semiautomatic drawing tool determines the location of a particular point of the image segmentation contour based on the current location of an input device pointer, e.g., a cursor, the location of the steepest luminance gradient, and the location of previously selected contour points of the image segmentation contour. As used herein, "luminance" may refer to a total luminance or, alternatively, the intensity of a particular color, texture and/or texture property.

FIG. 1 is a block diagram of a computing system 100 configured to implement one or more embodiments of the present disclosure. Computing system 100 may be a desktop computer, a laptop computer, smart phone, personal digital assistant (PDA), video game console, set top console, tablet computer, or any other type of computing device configured to receive input, process data, and display images, and is suitable for practicing one or more embodiments of the present invention. Computing system 100 includes, without limitation, a processor 101, input devices 102, output devices 103, and a memory 104, and is configured to run an imaging application 105 and a segmentation application 106 that may each reside in memory 104.

Computing system 100 is configured to display on output devices 103 one or more digital images as output from imaging application 105, receive input from an end user via input devices 102, and display output from segmentation application 106, such as one or more image segmentation contours, via output devices 103. Computing system 100 is also configured to store contour data 107 generated by segmentation application 106 in memory 104. It is noted that the computing device described herein is illustrative and that any other technically feasible configurations of computing devices fall within the scope of the present invention.

Processor 101 may be any suitable processor implemented as a central processing unit (CPU), a graphics processing unit (GPU), an application-specific integrated circuit (ASIC), a field programmable gate array (FPGA), and/or another type of processing unit. Processor 101 is configured to execute program instructions associated with a particular instruction set architecture (ISA) specific to processor 101, including imaging application 105 and segmentation application 106. Processor 101 is also configured to receive data from and transmit data to memory 104, to receive data from input devices 102, and to transmit data to output devices 103. For example, processor 101 may periodically deliver pixel data to one of output devices 103 with an analog or digital signal.

Input devices 102 include one or more devices that may be employed to generate a pointing device, such as a cursor, on a displayed digital image, and to input image location information to computing system 100. For example, input devices 102 may include a joystick, a keyboard, a mouse, a touchpad, an interactive pen display, and/or a pen tablet, among others. In addition, input devices 102 may include devices used to input data to computing system 100, such as an Ethernet port, a serial port, a compact disc (CD) drive, or a digital video disc (DVD) drive, among others. In some embodiments, one or more of input devices 102 are configured to couple computing system 100 to a network 110. Network 110 may be any technically feasible type of communications network that allows data to be exchanged between computing system 100 and external entities or devices, such as a hosted website or server machine. Examples of network 110 may include a wide area network (WAN), a local area network (LAN), a wireless (WiFi) network, and/or the Internet, among others.

Output devices 103 include one or more devices that output image data from computing system 100, such as a display device 120, a speaker, or a projector, among others. Display device 120 may be a computer monitor, a video display screen, a display apparatus incorporated into a hand held device, any conventional CRT or LED monitor, or any other technically feasible display screen configured to visually present (i.e., display) digital image and/or video information to an end user. In some embodiments, display device 120 is a terminal window displayed on another display device, such as a video display window that has been opened by imaging application 105 or by segmentation application 106.

Memory 104 may be a hard disk, a flash memory stick, a random access memory (RAM) module, or any other type of volatile or non-volatile memory unit capable of storing data. Memory 104 is configured to store various software programs that can be executed by processor 101, including imaging application 105 and segmentation application 106, each of which are described in greater detail below.

Imaging application 105 may be any software application configured to display digital images via display device 120, such as an image editing and/or image viewing application. In some embodiments, imaging application 105 functions as part of segmentation application 106, and runs whenever segmentation application 106 is run on computing system 100. Segmentation application 106 is an image segmentation program configured to perform one or more embodiments as described herein. As such, segmentation application 106 employs a semiautomatic drawing tool 300 that generates an image segmentation contour associated with a particular digital image displayed on display device 120, and stores the image segmentation contour as contour data 107 in memory 104. The operation of one embodiment of semiautomatic drawing tool 300 is described below in conjunction with FIG. 3.

Image segmentation is a well-known image processing procedure used to partition a two-dimensional digital image into separate segments, where each segment boundary is defined by a contour. Typically, the goal of segmentation is to produce a simplified representation of a digital image or portion of a digital image for clarity and/or ease of analysis. By partitioning a digital image into multiple segments, image segmentation may be used to locate objects and boundaries in images.

The result of image segmentation may be a set of segments that collectively cover an entire image or an area of interest in an image, or a set of contours extracted from the image. The contours defining these image segments are generally selected to correspond as closely as practicable to a visible edge in an image, such as a boundary between two regions of different brightness. For example, a visible edge used to determine an image segmentation contour may be an organ border in a medical cross-sectional image. When a user contours an organ or other visible structure in a digital image using a manual tracing tool, the resulting manually drawn image segmentation contour is generally not an accurate depiction of the boundary of the targeted organ or visible structure, even when the organ or structure of interest is clearly visible in the original image. One such scenario is illustrated in FIG. 2.

Figure 2:
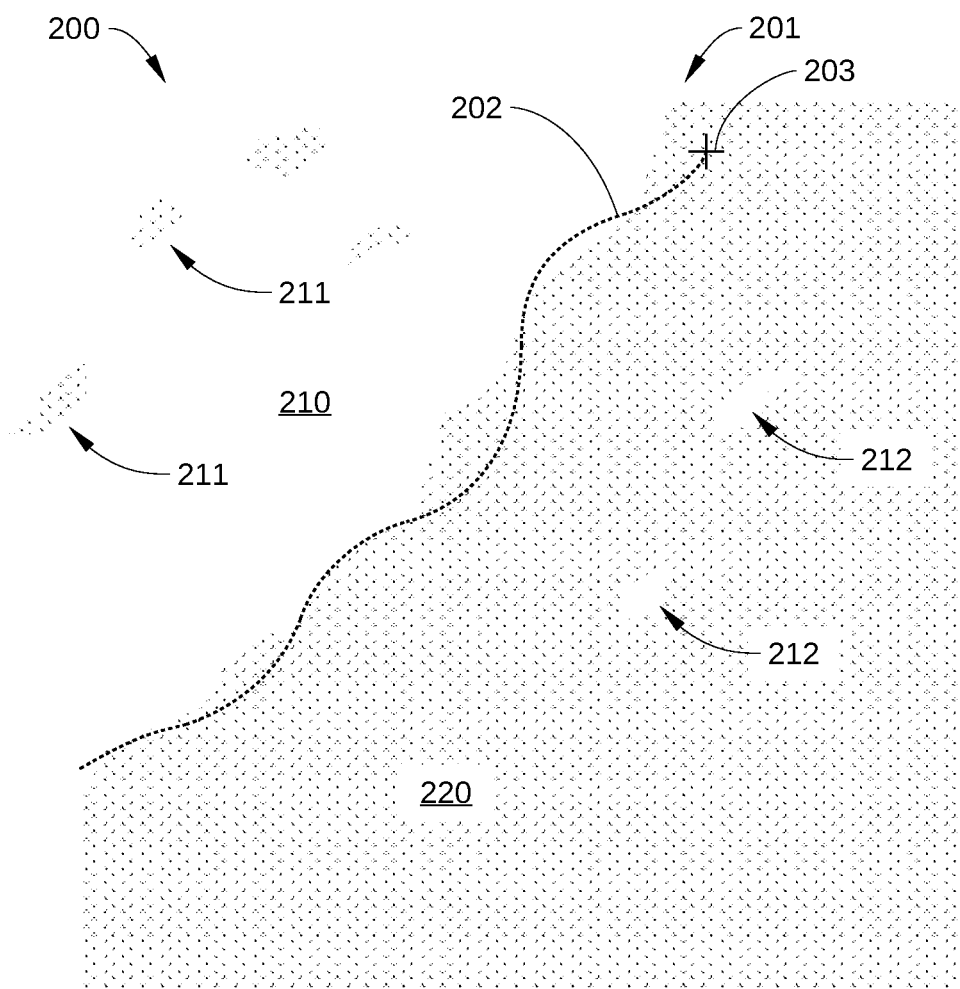
FIG. 2 is a partial schematic view of a visible edge in a digital image and an image segmentation contour in the process of being traced with a manual tracing tool.

FIG. 2 is a partial schematic view of a visible edge 201 in a digital image 200 and an image segmentation contour 202 in the process of being traced with a manual tracing tool. As shown, visible edge 201 is a visible boundary between a first region 210 and a second region 220 of digital image 200. Digital image 200 may be a digital medical image, generated by any technically feasible process, such as x-ray computed tomography (CT), magnetic resonance imaging (MRI), ultrasonography, and the like. First region 210 and second region 220 are two different visual structures in digital image 200, a visual structure being a region of an image that is visibly distinct from other regions of the image, based on color, brightness, texture, a combination thereof, or any other suitable visual metric. For example, first region 210 may be a region of digital image 200 that corresponds to an organ of interest, while second region 220 may be a region of digital image 200 that corresponds to tissue surrounding or adjacent to the organ of interest. In another example, first region 210 may be a region of digital image 200 that corresponds to a tissue type of interest having a particular appearance in digital image 200 and second region 220 may be a region of digital image 200 that corresponds to a different tissue type having a different appearance in digital image 200.

In the illustrated example of FIG. 2, second region 220 is a region of digital image 200 that is adjacent to first region 210 and has a substantially different luminance than first region 210. For example, second region 220 may have a visibly different average luminance than that of first region 210, i.e., the difference in average luminance of second region 220 is discernible to a user of the manual tracing tool. In FIG. 2, second region 220 is visibly darker overall than first region 210 and therefore has a lower average luminance than first region 210. It is noted that the average luminance of second region 220 may be lower than first region 210 even though portions 211 of first region 210 may have substantially the same luminance as the average luminance of second region 220, and/or portions 212 of second region 220 may have substantially the same luminance as the average luminance of first region 210. Furthermore, the difference in luminance between first region 210 and second region 210 may be based on average total luminance or on the average luminance of a particular color, since in some situation two visual structures in an image may have substantially similar average total luminance, but are still readily distinguished visually since each structure is a different color. Thus, in some situation, first region 210 may have an average intensity of a particular color that is different than an average intensity of the particular color in second region 220.

Image segmentation contour 202 is generated using a manual tracing tool, and therefore is defined when a user moves a cursor 203 along visible edge 201, for example using a computer mouse or other input device 102. Ideally, the user traces visible edge 201 as precisely as possible. In practice, however, due to the involved large scale hand and/or arm motions associated with using a computer mouse, drawing can be quite imprecise and jerky. Specifically, the path followed by cursor 203, and therefore the actual position of image segmentation contour 202, frequently drifts away from visible edge 201 and into first region 210 or second region 220. Consequently, the precision with which image segmentation contour 202 or any manually drawn contour follows visible edge 201 strongly depends on the skill, experience, and patience of the user.

Figure 3:
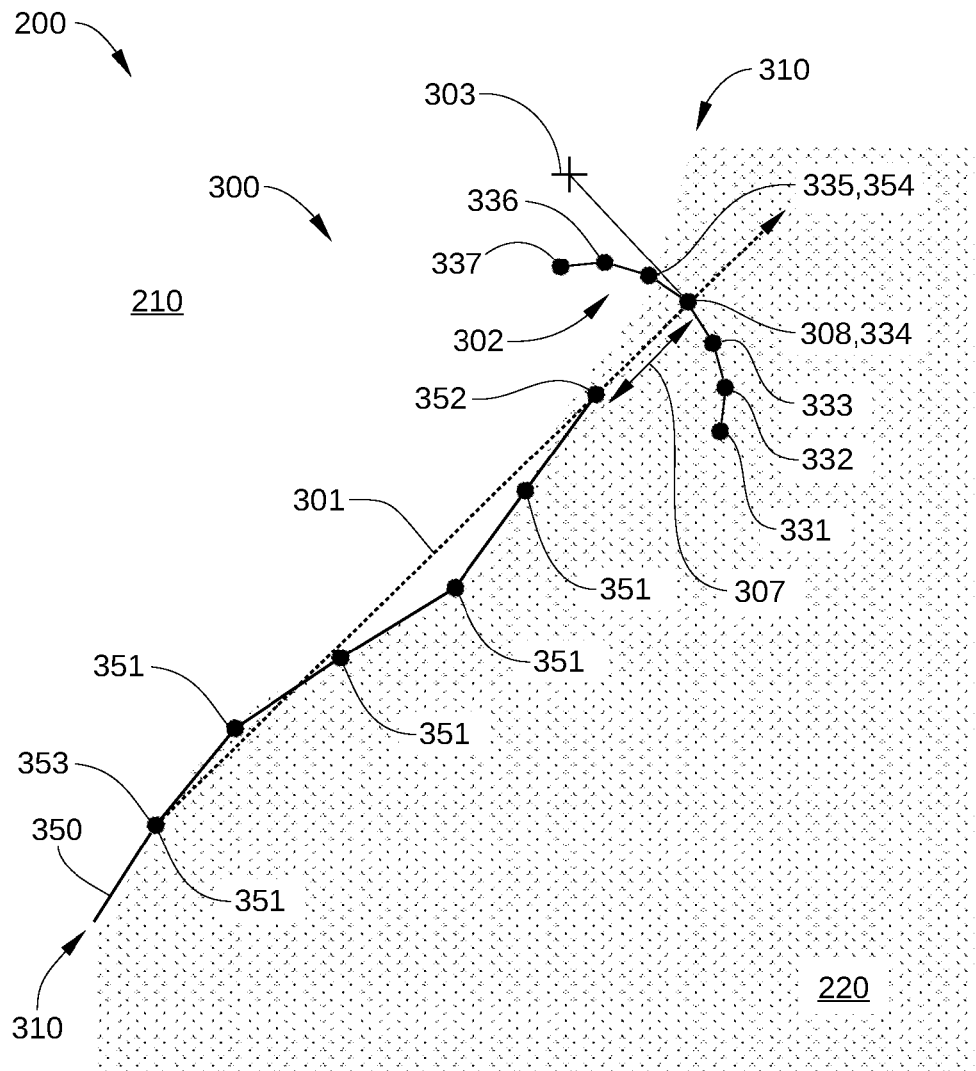
FIG. 3 is a conceptual diagram illustrating an example operation of a semiautomatic drawing tool, according to one or more embodiments of the present disclosure.

FIG. 3 is a conceptual diagram illustrating an example operation of a semiautomatic drawing tool 300, according to one or more embodiments of the present disclosure. Semiautomatic drawing tool 300 is configured to generate an image segmentation contour 350 between first region 210 and second region 220 of digital image 200. Generally, semiautomatic drawing tool 300 may be a software or firmware construct that generates image segmentation contour 350 for digital image 200 when displayed on display device 120. In some embodiments, semiautomatic drawing tool 300 may be employed in a fashion similar to that for a manual tracing tool, which typically generates an image segmentation contour based on user input, such as a path followed by a cursor across a digital image. However, unlike a manual tracing tool, semiautomatic drawing tool 300 generates image segmentation contour 350 for a digital image based on user input and on the location of a steep luminance gradient associated with a visible edge 310 in the digital image. In this way, semiautomatic drawing tool 300 enables a user to select a specific visible edge (e.g., visible edge 310) that defines a target organ or other visible structure in the image by positioning a cursor 303 proximate the visible edge, i.e., semiautomatic drawing tool 300 provides a user interface that displays the digital image and cursor 303, so that a user can indicate the visible edge. Concurrently, semiautomatic drawing tool 300 determines the exact path of image segmentation contour 350 along this user-selected visible edge. Thus, semiautomatic drawing tool 300 adapts the final path of image segmentation contour 350 to accurately follow the user-selected visible edge. In contrast, an image segmentation contour that has been drawn manually with a manual tracing tool generally does not accurately follow a targeted visible edge, as illustrated above in FIG. 2.

Elements of the user interface provided by semiautomatic drawing tool 300 include a direction vector 301, a sampling arc 302, and cursor 303, the latter of which is displayed to a user superimposed on digital image 200. Also displayed to the user is an existing portion of image segmentation contour 350 that includes multiple contour points 351 that have been selected previously, either via an automated procedure described herein or during a "learning phase" (described below). Digital image 200, cursor 303, and the existing portion of image segmentation contour 350 may be displayed to the user via display device 120 of FIG. 1, or via any other technically feasible display device. In addition, the position of cursor 303 is generally determined based on user input via one of input devices 102 of FIG. 1, such as a computer mouse.

Direction vector 301 indicates to semiautomatic drawing tool 300 a general direction in which to proceed when adding contour points 351 to image segmentation contour 350. Specifically, direction vector 301 is employed by semiautomatic drawing tool 300 to determine the location of sampling arc 302. As shown, direction vector 301 is defined by or otherwise based on two of previously selected contour points 351. In the embodiment illustrated in FIG. 3, direction vector 301 originates at an offset point 353 of image segmentation contour 350 and passes through an endpoint 352 of image segmentation contour 350. In this embodiment, endpoint 352 is the contour point 351 most recently added to segmentation contour 350, and offset point 353 is a point that is offset a predetermined number of points from endpoint 352. In the embodiment illustrated in FIG. 3, the predetermined number of points that offset point 353 is separated from endpoint 352 is five. In other embodiments, the predetermined number may be greater or smaller than five, or may be a user-selectable value. For example, when visible edge 310 follows a highly irregular path, the predetermined number of points that offset point 353 is separated from endpoint 352 may be decreased so that direction vector 301 can more accurately follow visible edge 310.

As shown, sampling arc 302 is positioned to intersect with direction vector 301, so that endpoint 352 is disposed between sampling arc 302 and offset point 353. In some embodiments, a displacement 307 between endpoint 352 and sampling arc 302 is determined based on the current location of cursor 303. For example, in the embodiment illustrated in FIG. 3, sampling arc 302 intersects with direction vector 301 at a projection point 308 that corresponds to an orthogonal projection of the current position of cursor 303 onto direction vector 301.

In some embodiments, semiautomatic drawing tool 300 determines the position of projection point 308 when a user input is received, such as a mouse button click. In other embodiments, semiautomatic drawing tool 300 determines the position of projection point 308 whenever cursor 303 has been displaced a predetermined distance from endpoint 352. In such embodiments, the predetermined distance may be measured in absolute units of physical distance displaced on an actual size version of digital image 200, (e.g., a particular number of millimeters) or in relative units of visual distance on the portion of digital image 200 that is currently displayed to a user (e.g., a particular number of pixels of display device 120). In such embodiments the corresponding physical size of sampling arc 302 to digital image 200 (when actual size) may vary depending on how much a user has zoomed in to visible edge 310. For example, sampling arc 302 may have a smaller actual size when the current view presented to a user is zoomed in to visible edge 310 and a larger actual size when zoomed out from visible edge 310. Alternatively, the corresponding physical size of sampling arc 302 to digital image 200 may instead be fixed. With these features, semiautomatic drawing tool 300 can accurately adapt image segmentation contour 350 to very small irregularities in visible edge 310.

In some embodiments, sampling arc 302 is a smooth curve, such as a mathematical function. In other embodiments, sampling arc 302 is defined by multiple sampling points 331-337, as depicted in FIG. 3. In the embodiment illustrated in FIG. 3, sampling arc 302 includes seven sampling points, however in other embodiments, sampling arc 302 may include more or fewer than seven sampling points. Using a larger number of sampling points facilitates more precise selection of the location of the next contour point 354 to be added to image segmentation contour 350, as described below. For example, in some embodiments, sampling arc 302 includes 13 or more sampling points. In addition, in some embodiments, sampling arc has a curved configuration, such as a circular arc with a fixed radius and covering a specific angle, and curves back toward endpoint 352. In such embodiments, sampling arc 302 may be an arc of 120 degrees having a fixed radius of a predetermined number of pixels of display device 120 (e.g., 15), so that the equivalent physical size of sampling arc 302 relative to digital image 200 varies depending on the zoom factor of the current view of digital image 200 displayed to the user. The configuration of sampling arc 302 as an arc that curves back toward endpoint 352 generally facilitates image segmentation contour 350 to be more accurately adapted to visible edge 310. In other embodiments, sampling arc 302 may be configured to include a first portion that is a straight line or any other geometrical curve or arc, originating at projection point 308. In such embodiments, sampling arc 302 is generally configured to include a second portion that mirrors the first portion with respect to direction vector 301, so that a portion of sampling arc 302 extends into both region 210 and region 220 of digital image 220.

Sampling arc 302 indicates a portion of digital image 200 that intersects direction vector 301 and typically extends into both first region 210 and second region 220. Semiautomatic drawing tool 300 uses sampling arc 302 in conjunction with direction vector 301 to determine the location of the next contour point 354 to be added to image segmentation contour 350. Specifically, semiautomatic drawing tool 300 constructs a luminance intensity profile for the portion of digital image 200 that corresponds to sampling arc 302, then selects the location of the next contour point 354 based on the location of the steepest luminance gradient of the intensity profile. Steepness of the luminance gradient can be calculated as the absolute value of the rate of change of luminance with respect to position in the intensity profile associated with sampling arc 302. One such embodiment of an intensity profile associated with sampling arc 302 is illustrated in FIG. 4.

Figure 4:
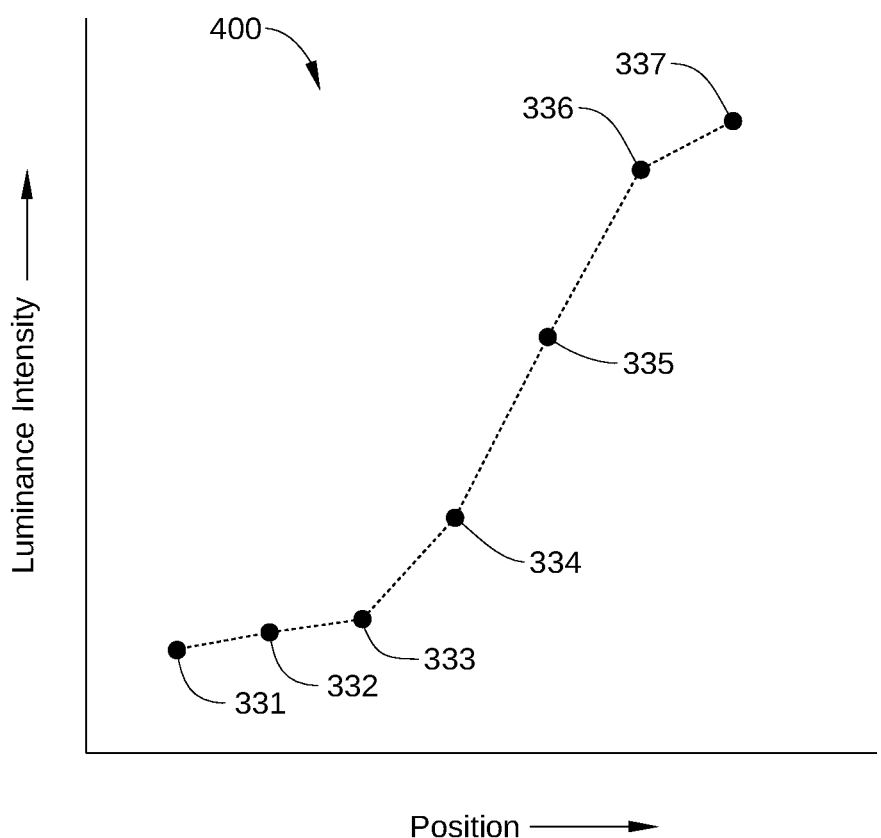
FIG. 4 schematically illustrates an intensity profile of a portion of a digital image that corresponds to a sampling arc in FIG. 3, according to one or more embodiments of the present disclosure.

FIG. 4 schematically illustrates an intensity profile 400 of a portion of digital image 200 that corresponds to sampling arc 302, according to one or more embodiments of the present disclosure. Intensity profile 400 indicates the luminance intensity of digital image 200 along sampling arc 302. The luminance intensity presented in intensity profile 400 may be the total luminance or, alternatively, the intensity of a particular color or texture. In embodiments in which sampling arc 302 is a smooth curve, intensity profile 400 may be implemented as a smooth curve. In embodiments in which sampling arc 302 includes multiple sampling points, such as in the embodiment illustrated in FIG. 4, intensity profile 400 indicates discrete values of luminance intensity at each of the multiple sampling points 331-337 of sampling arc 302.

Semiautomatic drawing tool 300 determines a slope (change in luminance vs. change in position or vice versa) of intensity profile 400 at each of the sampling points 331-337, and then selects a point on intensity profile 400 based on the location of the steepest luminance gradient of intensity profile 400. The point selected on intensity profile 400 is then accepted as the location of the next contour point 354 of image segmentation contour 350. In the scenario depicted in FIG. 3, sampling point 335 is the point selected on intensity profile 400. Intensity profile 400 may be a substantially smooth curve or may be constructed from multiple discrete sampling points.

In some embodiments, the location of the next contour point 354 may be determined by checking the extrema of intensity profile 400 (i.e., the maxima and minima of profile curve 400, including the start and endpoints thereof). In such embodiments, this pair of neighboring extrema (exA, exB) is selected which has the biggest absolute difference abs(exA-exB). Then only between those two extrema (exA and exB) does semiautomatic drawing tool 300 look for the point with the steepest gradient. This approach improves the result for edges that are smooth but still separate two regions of significantly different brightness. Thus, the above-described approach favors such edges over faint and sharp edges, which are often due the noise.

In embodiments in which intensity profile 400 comprises a substantially smooth curve, semiautomatic drawing tool 300 selects a point on intensity profile 400 that substantially corresponds to a position proximate the steepest brightness gradient of the intensity profile. For example, in such embodiments, each pixel of digital image 200 that is collocated with a portion of intensity profile 400 may be considered a point on the substantially smooth curve, and the location of a pixel that corresponds to the steepest brightness gradient is used for the position of next contour point 354. In embodiments in which intensity profile 400 is constructed with multiple sampling points 331-337 and is not a smooth curve, semiautomatic drawing tool 300 selects one of sampling points 331-337. In such embodiments, the selected point on intensity profile 400 may substantially correspond to a position proximate the steepest luminance gradient of intensity profile 400. For example, in the embodiment illustrated in FIG. 4, semiautomatic drawing tool 300 may select sampling point 335, which substantially coincides with the steepest luminance gradient of intensity profile 400, so that next contour point 354 is positioned at sampling point 335. With each contour point 351 added to image segmentation contour 350 in this way, the accurate positioning of segmentation contour 350 with respect to visible edge 310 is facilitated, that is, image segmentation contour 350 is adapted to precisely follow visible edge 310, even when a path 309 (shown in FIG. 3) followed by cursor 303 does not accurately follow visible edge 310. Hence, image segmentation contour 350 is sometimes referred to as an "adapted segmentation contour."

In some embodiments, semiautomatic drawing tool 300 may be configured with an initial learning phase, in which a specified number of contour points 351, e.g. ten, are manually selected by a user. The goal of this initial learning phase is to determine the sign of the gradient of intensity profile 400 at the location to which image segmentation contour 350 is adapted (i.e., whether the bright side of a visible edge is on the left or on the right side of image segmentation contour 350). Upon completion of the learning phase, semiautomatic drawing tool 300 then selects the location of each subsequent contour point 351 as described above in conjunction with FIGS. 3 and 4. Typically, the specified number of contour points 351 that are manually selected in such a learning phase is equal to or greater than the predetermined number of points separating endpoint 352 and offset point 353.

In some embodiments, semiautomatic drawing tool 300 may be configured to select the position of next contour point 354 based on either 1) the location of the steepest luminance gradient of intensity profile 400, as described above, or, if one or more prescribed conditions are not met, 2) the current location of cursor 303. One such prescribed condition may be that the steepest luminance gradient of intensity profile 400 meets or exceeds a predetermined threshold. For example, in one embodiment, unless the steepest luminance gradient of intensity profile 400 is greater than or equal to 10% of the current range in pixel luminance of the portion of digital image 200 currently displayed to a user on display device 120, semiautomatic drawing tool 300 selects the current location of cursor 303 as the location of next contour point 354. In another embodiment, unless the steepness gradient of intensity profile 400 at projection point 308 has a sign consistent with the steepness gradient of intensity profile 400 at endpoint 352, semiautomatic drawing tool 300 selects the current location of cursor 303 as the location of next contour point 354. Sign consistency between the current learned sign (as determined during a learning phase) and the steepest gradient of intensity profile 400 indicates that image segmentation contour 350 continues to follow visible edge 310 and is not branching onto an intersecting visible edge that does not separate first region 210 and second region 220 of digital image 200.

In yet another embodiment, unless the steepness gradient of intensity profile 400 satisfies both of the above-described conditions (luminance gradient meeting or exceeding a predetermined threshold and sign consistency of luminance gradient between endpoint 352 and projection point 308), semiautomatic drawing tool 300 selects the current location of cursor 303 as the location of next contour point 354.

In some embodiments, semiautomatic drawing tool 300 may be configured to delete one or more of the most recently added contour points 351, for example when the user has erroneously traced a portion of an incorrect visible edge or when semiautomatic drawing tool 300 has selected poorly positioned contour points 351. For example, in some embodiments, semiautomatic drawing tool 300 may be configured to delete contour points 351 when a user moves cursor 303 backward along image segmentation contour 350. In some embodiments, contour points 351 are deleted in this fashion as long as cursor 303 is within a predetermined distance of image segmentation contour 350. The predetermined distance may be measured in relative units of visual distance or absolute units of physical distance. In some embodiments, semiautomatic drawing tool 300 is configured to reinitialize with manually selected contour points 351 after one or more contour points are deleted in this way.

The above-described embodiments are sometimes referred to as "continuous mode," in which image segmentation profile 350 in FIG. 3 is generated when a user moves cursor 303, for example by holding a computer mouse button and then dragging cursor 303 along visible edge 310. In some embodiments, semiautomatic drawing tool 300 is configured to operate in a so-called "polygon mode," either instead of or in addition to continuous mode. In polygon mode, semiautomatic drawing tool 300 generates image segmentation contour 350 when a user selects specific locations proximate a visual structure of interest, for example by clicking a computer mouse button while changing the position of cursor 303. In such embodiments, semiautomatic drawing tool 300 may be configured to cause to be displayed a proposed continuation of image segmentation contour 350 between the most recently selected cursor 303 location and the current position of cursor 303. Thus, a user can constantly receive visual feedback regarding a proposed continuation until the next cursor position is selected (for example by clicking the computer mouse button). In this way, image segmentation contour 350 is generated by a user clicking around the visual structure to be segmented until the starting point is reached. Alternatively, a user may select a plurality of locations with cursor 303, and semiautomatic drawing tool 300 may be configured to cause a complete image segmentation contour 350 to be displayed after all these manually selected points have been input. Semiautomatic drawing tool 300 determines image segmentation contour 350 along visible edge 310 from one manually selected point to the next using the methods described above for continuous mode.

In some embodiments, the proposed continuation that is displayed to the user in polygon mode is determined by connecting endpoint 352 and the current location of cursor 303 with a straight line. The straight line is composed of a sequence of points separated by a predetermined physical distance (e.g., 1 mm) or visual distance (e.g., 5 pixels of display device 120). Each point of the sequence of points is then sequentially treated as a current location of cursor 303, i.e., a proposed next point for image segmentation contour 350 is located based on direction vector 301, the orthogonal projection of the point in the sequence of points onto direction vector 301, and an intensity profile associated with the projection point. An advantage of polygon mode over continuous mode is that a preview of a proposed continuation of image segmentation contour 350 is displayed to the user prior to being selected by the user (via a mouse click, for example).

Figure 5:
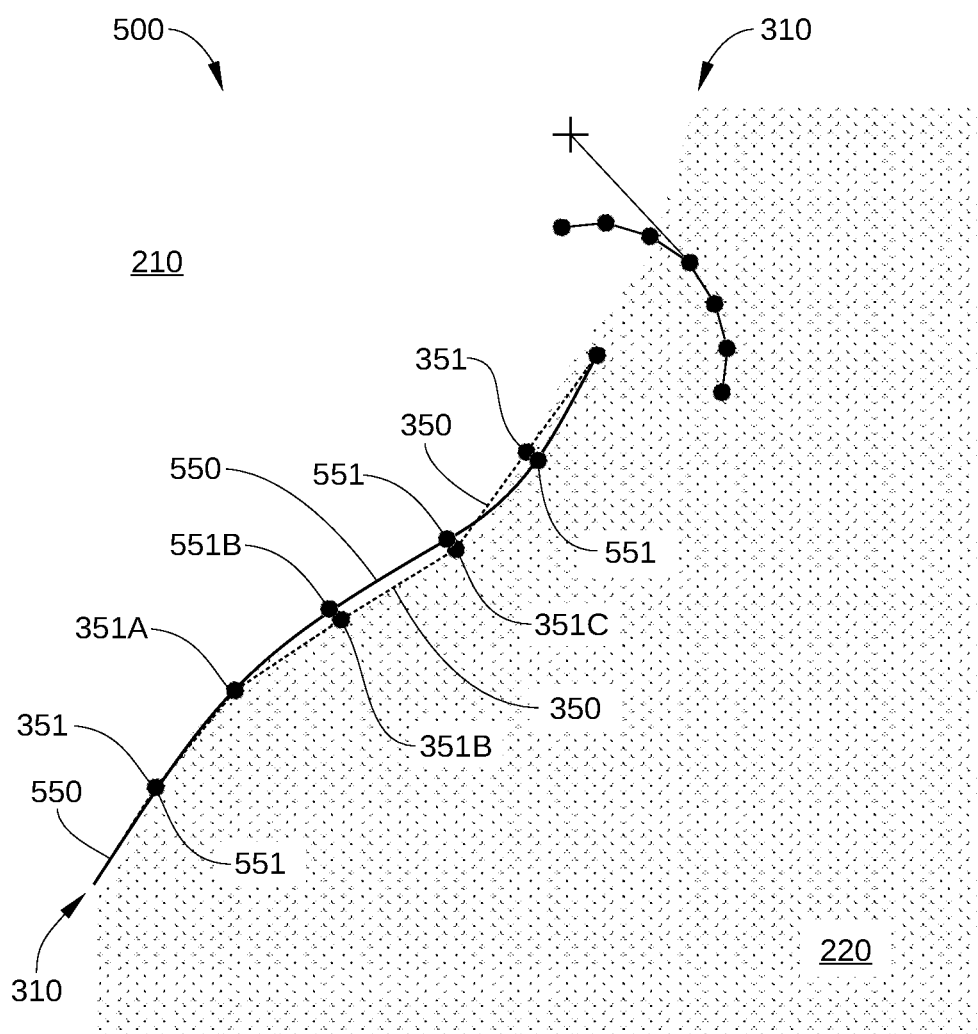
FIG. 5 is a conceptual diagram illustrating the operation of a semiautomatic drawing tool, according to one or more embodiments of the present disclosure.

In the embodiment illustrated in FIG. 3, image segmentation contour 350 follows previously selected contour points 351, and therefore intersects each of previously selected contour points 351. In some embodiments, a semiautomatic drawing tool also causes a smoothed segmentation contour to be displayed either in addition to or in lieu of image segmentation contour 350. One embodiment of a smoothed segmentation contour is illustrated in FIG. 5. FIG. 5 is a conceptual diagram illustrating the operation of a semiautomatic drawing tool 500, according to one or more embodiments of the present disclosure. Semiautomatic drawing tool 500 is configured to generate a smoothed segmentation contour 550 between first region 210 and second region 220 of digital image 200. Generally, semiautomatic drawing tool 500 is substantially similar in operation to semiautomatic drawing tool 300 described above in conjunction with FIGS. 3 and 4. In addition, semiautomatic drawing tool 500 is configured to generate and to cause to be displayed a smoothed segmentation contour 550.

As shown, semiautomatic drawing tool 500 generates smoothed segmentation contour 550, which can then be displayed in addition to or instead of image segmentation contour 350. In some embodiments, semiautomatic drawing tool 500 generates smoothed segmentation contour 550 by generating a smooth contour point 551 for each contour point 351 added to image segmentation contour 350. In such embodiments, when a contour point 351 is added to image segmentation contour 350, semiautomatic drawing tool 500 may calculate a location for a smooth contour point 551 corresponding to each of the N most recently added contour points 351, where N can be a fixed or user-selectable integer value. Semiautomatic drawing tool 500 may calculate the locations of these smooth contour points in any way that causes smoothed segmentation contour 550 to be a smoothed version of image segmentation contour 350. For example, in one embodiment, semiautomatic drawing tool 500 calculates a location for a smooth contour point 551 by calculating the mean location of the two neighboring contour points 351. Thus, in FIG. 5, the location of 551B, which corresponds to contour point 351B, is calculated as the mean location of contour points 351A and 351C. This process is performed for the N most recently added contour points 351. In this way, smoothed segmentation contour 551 may have a less segmented appearance than image segmentation contour 351, and in some situations may more accurately follow visible edge 310.

In some situations, a particular visual structure being segmented may be adjacent to one or more regions with higher average luminance than the visual structure and one or more regions with lower average luminance than the visual structure. For example, certain organs, such as the liver, may be adjacent to tissue that is generally brighter (bone) or darker (connective tissue) than the liver itself. Consequently, segmentation of such an organ involves one or more changes in the sign of a luminance intensity profile that a semiautomatic drawing tool uses to determine the location of additional contour points, such as intensity profile 400 in FIG. 4. Thus, when an image segmentation contour passes from a portion of a visual structure that is adjacent to a darker region to a portion of the visual structure that is adjacent to a lighter region, the sign of the intensity profile gradient at an endpoint of the image segmentation contour (e.g., endpoint 352 in FIG. 3) and sign of the intensity profile gradient at the next contour point of the image segmentation contour (e.g., next contour point 354) may not be consistent, even though the next contour point is positioned accurately on the targeted visible edge.

In some embodiments, the semiautomatic drawing tool is configured to reinitialize, i.e., begin a new learning phase with manually selected contour points, based on intensity profiles measured at recent cursor locations. In this way, a semiautomatic drawing tool can reset the sign value of intensity profile gradient that is used as a criterion for selecting the next contour point (such as next contour point 354) when an image segmentation contour passes from a portion of a visual structure that is adjacent to a darker region to a portion of the visual structure that is adjacent to a lighter region. For example, in one embodiment, a semiautomatic drawing tool determines an intensity profile for a plurality of cursor locations, calculates an average gradient value for each of these intensity profiles, and then calculates a moving average of these average gradient values for the most recently determined M cursor locations. When the moving average of the most recently determined M cursor locations has a different sign than the sign of the (currently) learned gradient value, the semiautomatic drawing tool begins a new learning phase (in which a number of manually selected contour points are added to the image segmentation contour).

In some embodiments, the above-described moving average may be required to meet additional criterion before the semiautomatic drawing tool begins a new learning phase. For example, in some embodiments, the absolute value of said moving average must meet or exceed a predetermined threshold. Thus, unless the moving average is greater than or equal to, for example, 10% of the current range in pixel luminance of the portion of digital image 200 currently displayed to a user on display device 120, the semiautomatic drawing tool does not begin a new learning phase, even when the moving average has a different sign than the sign of the intensity profile gradient of the most recently added contour point. In some embodiments, the distance between the current mouse position and the most recently added contour point must meet or exceed a predetermined threshold. Thus, unless such a distance is larger than the sampling arc radius, for example, the semiautomatic drawing tool does not begin a new learning phase, even when the moving average has a different sign than the sign of the intensity profile gradient of the most recently added contour point.

Figure 6:
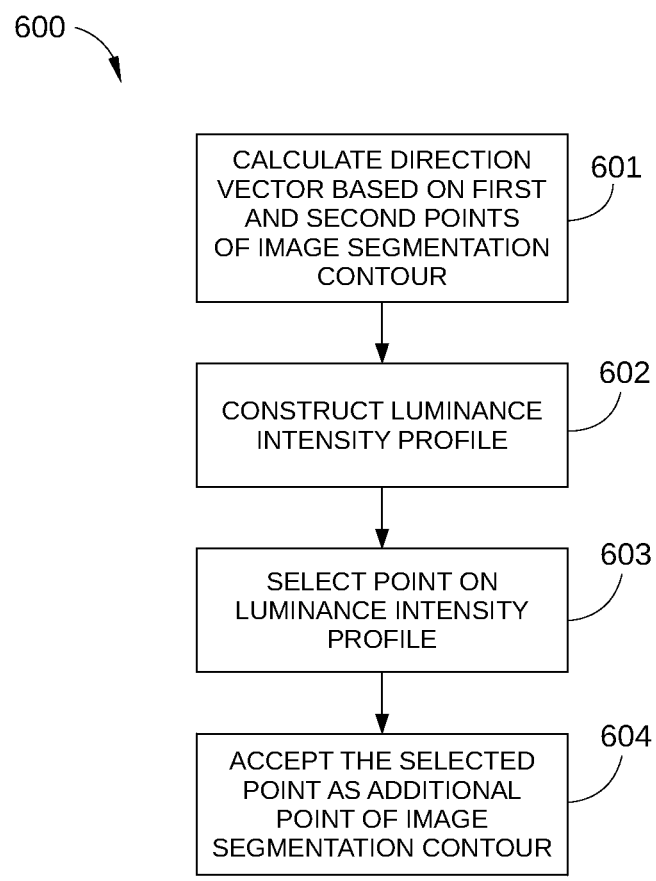
FIG. 6 sets forth a flowchart summarizing an example method for segmenting an image, according to one or more embodiments of the present disclosure.

FIG. 6 sets forth a flowchart summarizing an example method 600 for segmenting an image, according to one or more embodiments of the present disclosure. Method 600 may include one or more operations, functions, or actions as illustrated by one or more of blocks 601-604. Although the blocks are illustrated in a sequential order, these blocks may be performed in parallel, and/or in a different order than those described herein. Also, the various blocks may be combined into fewer blocks, divided into additional blocks, and/or eliminated based upon the desired implementation. Although method 600 is described in conjunction with computing system 100 of FIG. 1 and semiautomatic drawing tool 330 of FIG. 3, persons skilled in the art will understand that any suitably configured computing system and software application or firmware construct are within the scope of the invention.

In block 601, semiautomatic drawing tool 300 calculates direction vector 301 based on a first point of image segmentation contour 350 and a second point of image segmentation contour 350. For example, in some embodiments, the first point may be endpoint 352 and the second point may be offset point 353. Image segmentation contour 350 is being generated along a visible edge of digital image 200, such as visible edge 310, and partially separates first region 210 of the digital image 200 from second region 220 of digital image 200. Upon completion of image segmentation contour 350, first region 210 is fully separated from second region 220 of digital image 200 by image segmentation contour 350.

In block 602, semiautomatic drawing tool 300 constructs a luminance intensity profile, such as intensity profile 400, for a portion of the image that intersects the vector at an intersection point. For example, in some embodiments, the portion of digital image 200 for which semiautomatic drawing tool 300 constructs the intensity profile is a portion of digital image 200 that is disposed in both first region 210 and second region 220. The location of the intersection point is selected based on user input, such as a current cursor position on a display device. In some embodiments, the intersection point is a projection point, e.g. projection point 308, that corresponds to an orthogonal projection of the current position of cursor 303 onto direction vector 301.

In block 603, semiautomatic drawing tool 300 selects a point on the intensity profile. In some embodiments, the selected point on the intensity profile substantially corresponds to a position proximate a steepest luminance gradient of the intensity profile, since the steepest luminance gradient indicates the location of visible edge 310.

In block 604, semiautomatic drawing tool 300 accepts the selected point on the intensity profile as an additional point of image segmentation contour 350. Consequently, the additional point on image segmentation contour 350 is accurately located on visible edge 310, since the location of the steepest luminance gradient on the intensity profile corresponds to a point where visible edge 310 intersects the portion of digital image 200 corresponding to the intensity profile (e.g., sampling arc 302). In some embodiments, when the selected point is accepted as an additional point on image segmentation contour 350, contour data 107 in memory 104 are updated to include the additional point, and the displayed version of image segmentation contour 350 is modified accordingly.

Figure 7:
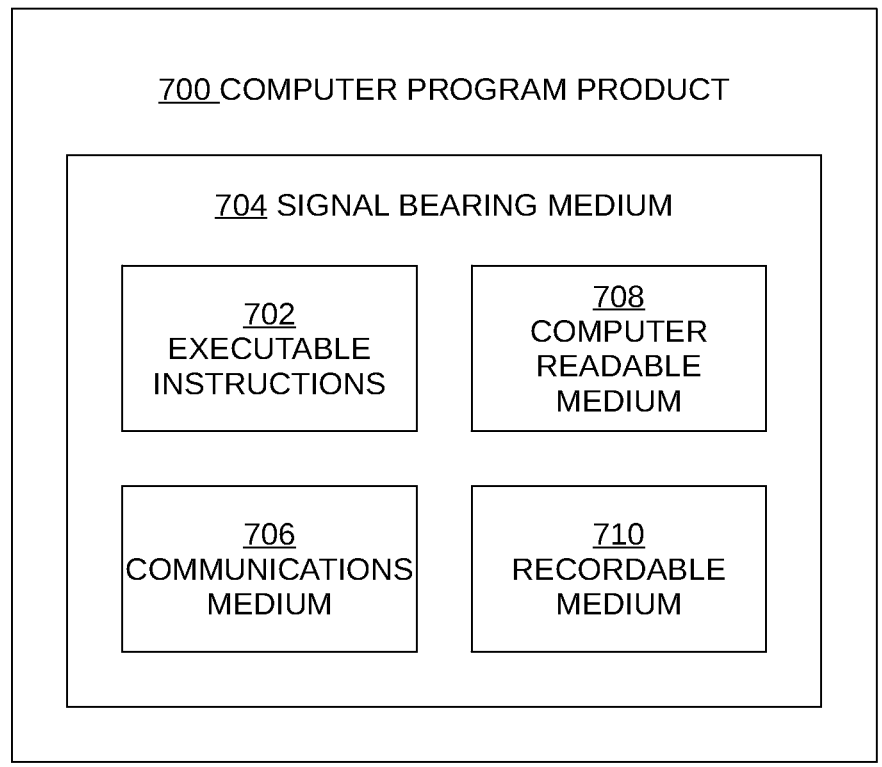
FIG. 7 is a block diagram of an illustrative embodiment of a computer program product for implementing a method for segmenting an image, according to one or more embodiments of the present disclosure.

FIG. 7 is a block diagram of an illustrative embodiment of a computer program product 700 for implementing a method for segmenting an image, according to one or more embodiments of the present disclosure. Computer program product 700 may include a signal bearing medium 704. Signal bearing medium 704 may include one or more sets of executable instructions 702 that, when executed by, for example, a processor of a computing device, may provide at least the functionality described above with respect to FIGS. 1-6.

In some implementations, signal bearing medium 704 may encompass a non-transitory computer readable medium 708, such as, but not limited to, a hard disk drive, a Compact Disc (CD), a Digital Video Disk (DVD), a digital tape, memory, etc. In some implementations, signal bearing medium 704 may encompass a recordable medium 710, such as, but not limited to, memory, read/write (R/W) CDs, R/W DVDs, etc. In some implementations, signal bearing medium 704 may encompass a communications medium 706, such as, but not limited to, a digital and/or an analog communication medium (e.g., a fiber optic cable, a waveguide, a wired communications link, a wireless communication link, etc.). Computer program product 700 may be recorded on non-transitory computer readable medium 708 or another similar recordable medium 710.

In sum, embodiments of the present disclosure enable segmentation of a digital image via a semiautomatic drawing tool. The semiautomatic drawing tool determines the locations of points that define an image segmentation contour based on both user input and on the location of a steep luminance gradient corresponding to a visible edge in the digital image. Because the semiautomatic drawing tool positions points of the image segmentation contour based on a combination of user input and automated detection of the visible edge, the contour so generated is adapted to accurately follow the visible edge.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A computer-implemented method for segmenting an image, the method comprising:
    calculating, by a processor, a direction vector based on a first point of an image segmentation contour and a second point of the image segmentation contour, wherein the image segmentation contour at least partially separates a first region of the image from a second region of the image; and
    constructing, by the processor, a luminance intensity profile for a portion of the image that intersects the direction vector at an intersection point, wherein the first region of the image has a first average luminance associated therewith, the second region has a second average luminance associated therewith, and the first average luminance is different from the second average luminance.

2. The method of claim 1, further comprising:
    selecting a point on the luminance intensity profile; and
    accepting the point on the luminance intensity profile as an additional point of the image segmentation contour.

3. The method of claim 2, wherein selecting the point on the luminance intensity profile comprises selecting a point on the luminance intensity profile that substantially corresponds to a location proximate a steepest luminance gradient of the intensity profile.

4. The method of claim 1, further comprising determining a location of the intersection point based on user input.

5. The method of claim 4, wherein the user input comprises a current cursor position in the image.

6. The method of claim 5, wherein determining the location of the intersection point based on user input comprises performing an orthogonal projection of the current cursor position onto the direction vector.

7. The method of claim 5, wherein determining the location of the intersection point based on user input comprises performing an orthogonal projection onto the direction vector from a point disposed on a line between an endpoint of the contour and the current cursor position.

8. The method of claim 1, wherein the first point comprises a current endpoint of the image segmentation contour.

9. The method of claim 1, wherein the second point comprises a point of the image segmentation contour that is offset a predetermined number of points from an endpoint of the image segmentation contour.

10. The method of claim 9, further comprising setting a value of the predetermined number of points based on a user input.

11. The method of claim 1, wherein the first average luminance is visibly different from the second average luminance.

12. The method of claim 11, wherein the first average luminance comprises an average intensity of a particular color, and the second average luminance intensity comprises the average intensity of the particular color.

13. The method of claim 1, wherein the luminance intensity profile comprises a smooth curve.

14. The method of claim 1, wherein the luminance intensity profile comprises a predetermined number of discrete points.

15. The method of claim 14, wherein the luminance intensity profile comprises an arc on which the discrete points are disposed.

16. The method of claim 15, wherein a portion of the discrete points are located in the first region and a portion of the discrete points are located in the second region.

17. The method of claim 1, wherein the portion of the image is disposed in both the first region of the image and the second region of the image.

18. The method of claim 1, wherein the first region of the image has a first texture property value associated therewith, the second region has a second texture property value associated therewith, and the first texture property is visibly different from the second texture property.

19. A computing device configured to segment an image, the computing device comprising:
a processor;
a memory coupled to the processor;
an input circuitry coupled to the processor and configured to generate a pointing device on a displayed digital image and to input image location information to the processor; and
an output circuitry coupled to the processor and configured to output image data from the processor,
wherein the processor is configured to:
calculate a direction vector based on a first point of an image segmentation contour and a second point of the image segmentation contour, wherein the image segmentation contour at least partially separates a first region of the displayed digital image from a second region of the displayed digital image; and
construct a luminance intensity profile for a portion of the displayed digital image that intersects the direction vector at an intersection point, wherein the first region of the displayed digital image has a first average luminance associated therewith, the second region of the displayed digital image has a second average luminance associated therewith, and the first average luminance is different from the second average luminance.

20. The computing device of claim 19, wherein the processor is configured to:
select a point on the luminance intensity profile;
accept the point on the luminance intensity profile as an additional point of the image segmentation contour to form an updated image segmentation contour; and
display the updated image segmentation contour via the output circuitry.

21. The computing device of claim 19, wherein the processor is configured to determine a location of the intersection point based on user input via the input circuitry.

22. The computing device of claim 21, wherein the user input comprises a current cursor position in the displayed digital image.

23. A non-transitory computer readable storage medium comprising computer-executable instructions, wherein in response to execution of the instructions by a computer, causes the computer to:
calculate a direction vector based on a first point of an image segmentation contour and a second point of the image segmentation contour, wherein the image segmentation contour at least partially separates a first region of an image from a second region of the image; and
construct a luminance intensity profile for a portion of the displayed image that intersects the direction vector at an intersection point, wherein the first region of the image has a first average luminance associated therewith, the second region of the image has a second average luminance associated therewith, and the first average luminance is different from the second average luminance.

* * * * *